US011008883B2

(12) United States Patent
Zatorski et al.

(10) Patent No.: US 11,008,883 B2
(45) Date of Patent: May 18, 2021

(54) TURBOMACHINE WITH A GEARBOX AND INTEGRATED ELECTRIC MACHINE ASSEMBLY

(71) Applicant: General Electric Company, Schenectady, NY (US)

(72) Inventors: Darek Tomasz Zatorski, Fort Wright, KY (US); Gert Johannes van der Merwe, Lebanon, OH (US); Brandon Wayne Miller, Liberty Township, OH (US); Daniel Alan Niergarth, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 14 days.

(21) Appl. No.: 15/709,535

(22) Filed: Sep. 20, 2017

(65) Prior Publication Data

US 2019/0085714 A1    Mar. 21, 2019

(51) Int. Cl.
*F01D 15/10* (2006.01)
*F01D 15/12* (2006.01)
(Continued)

(52) U.S. Cl.
CPC .............. *F01D 15/10* (2013.01); *B64D 27/10* (2013.01); *F01D 1/26* (2013.01); *F01D 5/03* (2013.01);
(Continued)

(58) Field of Classification Search
CPC . F01D 15/10; F01D 15/12; F01D 1/26; F01D 5/03; F01D 25/16; B64D 27/10; F02C 7/36; H02K 7/116; H02K 7/1823
See application file for complete search history.

(56) References Cited

U.S. PATENT DOCUMENTS

| 3,688,505 A | 9/1972 | Dison |
| 4,909,031 A | 3/1990 | Grieb |

(Continued)

FOREIGN PATENT DOCUMENTS

CN    106061787 A    10/2016
DE    102012210242 A1 * 12/2013 ............. H02K 7/116
(Continued)

OTHER PUBLICATIONS

Extended European Search Report and Opinion issued in connection with corresponding EP Application No. 18194838.1 dated Jan. 31, 2019.

(Continued)

*Primary Examiner* — Viet P Nguyen
(74) *Attorney, Agent, or Firm* — Dority & Manning, P.A.

(57) ABSTRACT

A turbomachine includes a turbine section including a turbine. The turbine includes a first plurality of turbine rotor blades and a second plurality of turbine rotor blades, the first plurality of turbine rotor blades and second plurality of turbine rotor blades alternatingly spaced along the axial direction. The turbomachine also includes a gearbox. The first plurality of turbine rotor blades and the second plurality of turbine rotor blades are each coupled to one of a ring gear, a planet gear, or a sun gear of the gearbox such that the first plurality of turbine rotor blades is rotatable with the second plurality of turbine rotor blades through the gearbox. The turbomachine also includes an electric machine assembly including a rotor coupled to one of the ring gear, the planet gear, or the sun gear of the gearbox such that the rotor rotates relative to a stator during operation.

19 Claims, 8 Drawing Sheets

(51) Int. Cl.
  *F01D 1/26* (2006.01)
  *F01D 25/16* (2006.01)
  *H02K 7/18* (2006.01)
  *H02K 7/116* (2006.01)
  *B64D 27/10* (2006.01)
  *F01D 5/03* (2006.01)
  *F02K 5/00* (2006.01)
  *F02C 7/36* (2006.01)

(52) U.S. Cl.
  CPC ............ *F01D 15/12* (2013.01); *F01D 25/16* (2013.01); *F02C 7/36* (2013.01); *F02K 5/00* (2013.01); *H02K 7/116* (2013.01); *H02K 7/1823* (2013.01); *F05D 2220/32* (2013.01); *F05D 2220/76* (2013.01); *F05D 2240/50* (2013.01); *F05D 2260/40311* (2013.01)

(56) References Cited

U.S. PATENT DOCUMENTS

| | | | |
|---|---|---|---|
| 4,936,748 A | 6/1990 | Adamson et al. | |
| 5,010,729 A | 4/1991 | Adamson et al. | |
| 7,832,193 B2 | 11/2010 | Orlando et al. | |
| 7,937,927 B2 | 5/2011 | Suciu et al. | |
| 8,061,968 B2* | 11/2011 | Merry | F01D 5/022 |
| | | | 415/68 |
| 8,350,398 B2 | 1/2013 | Butt | |
| 8,375,695 B2 | 2/2013 | Schilling et al. | |
| 8,661,781 B2 | 3/2014 | Moore et al. | |
| 9,017,028 B2* | 4/2015 | Fabre | B64C 11/48 |
| | | | 416/128 |
| 9,611,788 B2 | 4/2017 | Sidelkovskiy | |
| 2003/0176223 A1 | 9/2003 | Aoki | |
| 2006/0005544 A1* | 1/2006 | Herlihy | F02C 3/107 |
| | | | 60/772 |
| 2008/0138195 A1 | 6/2008 | Kern et al. | |
| 2008/0149445 A1 | 6/2008 | Kern et al. | |
| 2009/0145136 A1* | 6/2009 | Norris | F01D 5/022 |
| | | | 60/792 |
| 2010/0154384 A1 | 6/2010 | Schilling | |
| 2011/0243735 A1 | 10/2011 | Balk et al. | |
| 2012/0177493 A1 | 7/2012 | Fabre | |
| 2013/0000323 A1* | 1/2013 | Kupratis | F02C 7/36 |
| | | | 60/801 |
| 2013/0247539 A1* | 9/2013 | Hoppe | F02C 7/32 |
| | | | 60/39.15 |
| 2014/0150401 A1* | 6/2014 | Venter | F02C 7/36 |
| | | | 60/39.45 |
| 2015/0284071 A1 | 10/2015 | Veilleux, Jr. et al. | |
| 2015/0337677 A1* | 11/2015 | Roberge | F01D 15/10 |
| | | | 290/52 |
| 2016/0091061 A1 | 3/2016 | Erjavec et al. | |
| 2016/0149469 A1* | 5/2016 | Lemmers | H02K 7/116 |
| | | | 290/1 A |
| 2016/0356225 A1* | 12/2016 | Sheridan | F02K 3/06 |
| 2016/0368363 A1* | 12/2016 | Petersen | B60L 3/0061 |
| 2017/0211484 A1* | 7/2017 | Sheridan | F02C 7/36 |
| 2018/0087396 A1* | 3/2018 | van der Merwe | F02C 3/113 |
| 2018/0209350 A1* | 7/2018 | Kupratis | F02C 3/10 |
| 2019/0085715 A1* | 3/2019 | van der Merwe | F01D 15/10 |

FOREIGN PATENT DOCUMENTS

| | | |
|---|---|---|
| EP | 1 933 017 A2 | 6/2008 |
| EP | 1 936 238 A2 | 6/2008 |
| EP | 2 728 140 A2 | 5/2014 |
| GB | 1 097 632 A | 1/1968 |
| JP | S59200598 A | 11/1984 |
| JP | H02161135 A | 6/1990 |
| JP | H02238160 A | 9/1990 |
| JP | 2002/332871 A | 11/2002 |
| JP | 2008/144762 A | 6/2008 |
| JP | 2008/157458 A | 7/2008 |
| JP | 2010/144724 A | 7/2010 |
| JP | 2011/012675 A | 1/2011 |
| JP | 2012/512987 A | 6/2012 |

OTHER PUBLICATIONS

Machine Translated Japanese Search Report Corresponding to Application No. 2018167435 dated Nov. 20, 2019.
Combined Chinese Search Report and Office Action Corresponding to Application No. 201811092684 dated Aug. 3, 2020.

* cited by examiner

TURBOMACHINE WITH A GEARBOX AND INTEGRATED ELECTRIC MACHINE ASSEMBLY

FIELD

The present subject matter relates generally to a turbomachine, and more particularly, to a turbomachine having a gearbox with an electric machine assembly integrated at least partially therein.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

At least certain of these gas turbine engines additionally include an outer nacelle at least partially enclosing the fan and/or the core, and defining a bypass airflow passage with the core. In order to generate electrical power from operation of the turbomachine, the gas turbine engine may include a generator within the nacelle. The generator may be coupled to one or more rotating components of the core, such that it is rotatable with the core.

However, inclusion of a generator within the nacelle may result in a relatively heavy generator that may take up a relatively large footprint within the nacelle. Such may therefore result in less than ideal aerodynamic lines in an under-cowl area result. Accordingly, a gas turbine engine including an electric machine, such as an electric generator, that is not positioned in the outer nacelle would be beneficial. Further, an electric machine included within the gas turbine engine having a reduced overall weight would also be useful.

BRIEF DESCRIPTION

Aspects and advantages of the invention will be set forth in part in the following description, or may be obvious from the description, or may be learned through practice of the invention.

In one exemplary embodiment of the present disclosure, a turbomachine is provided. The turbomachine defines a radial direction and an axial direction. The turbomachine includes a turbine section including a turbine, the turbine including a first plurality of turbine rotor blades and a second plurality of turbine rotor blades, the first plurality of turbine rotor blades and second plurality of turbine rotor blades alternatingly spaced along the axial direction. The turbomachine also includes a gearbox including a ring gear, a planet gear, and a sun gear, wherein the first plurality of turbine rotor blades and the second plurality of turbine rotor blades are each coupled to one of the ring gear, the planet gear, or the sun gear such that the first plurality of turbine rotor blades is rotatable with the second plurality of turbine rotor blades through the gearbox. The turbomachine also includes an electric machine assembly including a rotor and a stator, the rotor coupled to one of the ring gear, the planet gear, or the sun gear of the gearbox such that the rotor rotates relative to the stator during operation of the turbomachine.

In certain exemplary embodiments the gearbox further includes a planet gear carrier, wherein the planet gear defines a local axis and is rotatably coupled to the planet gear carrier such that it is rotatable about its local axis, wherein the rotor of the electric machine assembly is coupled to the planet gear such that the rotor is rotatable about the local axis of the planet gear with the planet gear.

In certain exemplary embodiments the planet gear of the gearbox includes a plurality of planet gears, wherein the gearbox further includes a planet gear carrier, wherein each planet gear of the plurality of planet gears defines a local axis and is rotatably coupled to the planet gear carrier such that it is rotatable about its respective local axis, wherein the electric machine assembly further includes a plurality of rotors, wherein each of the plurality of rotors is coupled to one of the planet gears of the plurality of planet gears such that it is rotatable about the local axis of the respective planet gear with the respective planet gear.

In certain exemplary embodiments the electric machine assembly is configured to generate between about 100 kilowatts of electrical power and about 10 megawatts of electrical power during operation.

In certain exemplary embodiments the electric machine assembly is configured to provide between about 130 horsepower and about 13,000 horsepower of mechanical power to the first rotatable component, the second rotatable component, or both during operation.

The turbomachine of claim 1, wherein the first plurality of turbine rotor blades is coupled to the ring gear, wherein the second plurality of turbine rotor blades is coupled to the sun gear, and wherein the rotor of the electric machine assembly is coupled to one of the ring gear or the sun gear.

In certain exemplary embodiments the first plurality of turbine rotor blades is configured as a plurality of low-speed turbine rotor blades, wherein the second plurality of turbine rotor blades is configured as a plurality of high-speed turbine rotor blades, and wherein the plurality of low-speed turbine rotor blades are configured to rotate in an opposite circumferential direction than the plurality of high-speed turbine rotor blades.

In another exemplary embodiment of the present disclosure, a turbomachine is provided. The turbomachine includes a first rotatable component; a second rotatable component; a stationary component; and a gearbox. The gearbox includes a ring gear, a sun gear, a planet gear, and a planet gear carrier, the planet gear defining a local axis and coupled to the planet gear carrier, wherein the first rotatable component, the second rotatable component, and the stationary component are each coupled to one of the ring gear, the planet gear carrier, or the sun gear such that the first rotatable component is rotatable with the second rotatable component through the gearbox. The turbomachine also includes an electric machine assembly including a rotor and a stator, the rotor coupled to the planet gear of the gearbox such that the rotor is rotatable about the local axis of the planet gear with the planet gear during operation of the turbomachine.

In certain exemplary embodiments the first rotatable component is a first plurality of turbine rotor blades, wherein the second rotatable component is a second plurality of turbine rotor blades, wherein the first plurality of turbine rotor blades and second plurality of turbine rotor blades are alternatingly spaced along an axial direction of the turbomachine.

For example, in certain exemplary embodiments the first plurality of turbine rotor blades is configured as a plurality of low-speed turbine rotor blades, wherein the second plurality of turbine rotor blades is configured as a plurality of high-speed turbine rotor blades, and wherein the plurality of low-speed turbine rotor blades are configured to rotate in an opposite circumferential direction than the plurality of high-speed turbine rotor blades.

In certain exemplary embodiments the stator is fixed relative to the planet gear carrier.

In certain exemplary embodiments the planet gear is coupled to a planet gear shaft extending along the local axis of the planet gear, and wherein the rotor of the electric machine assembly is coupled to the planet gear shaft.

For example, in certain exemplary embodiments the planet gear and planet gear shaft are together rotatably supported substantially completely by a bearing assembly, the bearing assembly including a first bearing positioned forward of the planet gear and rotor and a second bearing positioned aft of the planet gear and rotor.

In certain exemplary embodiments the planet gear of the gearbox is a first planet gear, wherein the gearbox further includes a second planet gear coupled to the planet gear carrier and defining a local axis, wherein the rotor and the stator of the electric machine assembly are configured as part of a first electric machine, wherein the electric machine assembly further includes a second electric machine, the second electric machine including a second rotor and a second stator, wherein the second rotor is coupled to the second planet gear of the gearbox such that the second rotor is rotatable about the local axis of the second planet gear with the second planet gear during operation of the turbomachine.

For example, in certain exemplary embodiments the electric machine assembly includes a main electric line, and wherein the first electric machine and the second electric machine are electrically connected in series with the main electric line.

In certain exemplary embodiments the first rotatable component is a low pressure spool of the turbomachine, and wherein the second rotatable component is a fan shaft of a fan assembly of the turbomachine.

In another embodiment of the present disclosure, a propulsion system is provided. The propulsion system includes a turbomachine including a gearbox and an electric machine assembly, the gearbox including a ring gear, a planet gear, and a sun gear, and the electric machine assembly including a rotor and a stator, the rotor of the electric machine assembly coupled to one of the ring gear, the planet gear, or the sun gear of the gearbox such that the rotor rotates relative to the stator during operation. The propulsion system also includes an electrical power component, the electric machine assembly electrically connectable with the electrical power component for providing electrical power to, or receiving electrical power from, the electrical power component during operation of the turbomachine.

In certain exemplary embodiments the electrical power component is configured as an electric energy storage unit configured to receive electrical power from the electric machine of the turbomachine during operation of the turbomachine.

In certain exemplary embodiments the electrical power component is configured as an electric propulsor configured to generate thrust for the propulsion system when the electric machine of the turbomachine provides electrical power to the electric propulsor.

In certain exemplary embodiments the electric machine assembly is configured to generate between about 100 kilowatts of electrical power and about 10 megawatts of electrical power during operation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
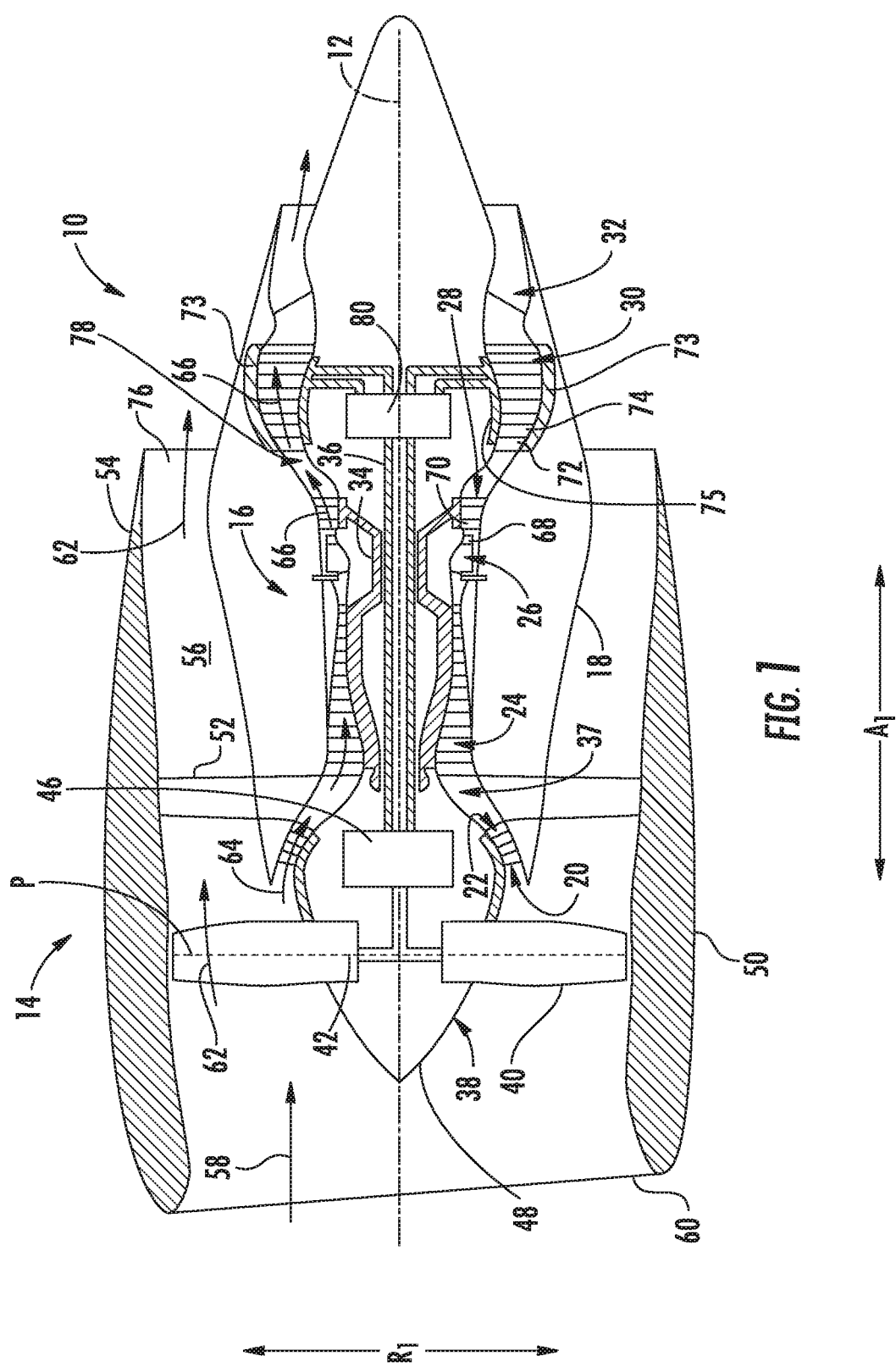
FIG. 1 is a schematic cross sectional view of an exemplary gas turbine engine incorporating an exemplary embodiment of a turbine section according to an aspect of the present disclosure.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The terms "low speed" and "high-speed" refer to relative speeds, such as relative rotational speeds, of two components during operations of the turbomachine, and do not imply or require any minimum or maximum absolute speeds.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a turbomachine including a first rotatable component, a second rotatable component, a stationary component, and a gearbox. The gearbox includes a ring gear, a planet gear, and a sun gear, with each of the first rotatable component, the second rotatable component, and the stationary component coupled to one of the ring gear, the planet gear, or sun gear, such that the first rotatable component is rotatable with the second rotatable component through the gearbox. In certain embodiments, the first rotatable component may be a first plurality of turbine rotor blades of a turbine and the second rotatable component may be a second plurality of turbine rotor blades of the turbine.

The turbomachine also includes an electric machine assembly integrated at least partially into the gearbox. For example, in at least certain embodiments, the electric machine assembly may include an electric machine having a rotor coupled to the planet gear of the gearbox and a stator coupled to, e.g., a planet gear carrier of the gearbox. Further, in certain of these exemplary embodiments, the electric machine assembly may further include a plurality of electric machines coupled in a similar manner to a respective plurality of planet gears of the gearbox. In other embodiments, however, the electric machine of the electric machine assembly may instead include a rotor coupled to the ring gear, the sun gear, or the planet gear carrier (e.g., in the event the ring gear or sun gear is held stationary).

Inclusion of an electric machine assembly integrated into a gearbox in accordance with one or more these exemplary embodiments may result in an overall more efficient gas turbine engine, as an overall weight of the gearbox and electric machine may be reduced. Further, inclusion of an electric machine assembly integrated into a gearbox in accordance with one or more these exemplary embodiments may result in a more compact electric machine assembly given that certain components within the gearbox may serve dual functions.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, and turbine section together define a core air flowpath 37 extending from the annular inlet 20 through the LP compressor 22, HP compressor 24, combustion section 26, HP turbine section 28, LP turbine section 30 and jet nozzle exhaust section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. The fan blades 40 and disk 42 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that for the embodiment depicted, the nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of a first plurality of LP turbine rotor blades 72 that are coupled to an outer drum 73, and a second plurality of LP turbine rotor blades 74 that are coupled to an inner drum 75. The first plurality of LP turbine rotor blades 72 and second plurality of LP turbine rotor blades 74 are alternatingly spaced and rotatable with one another through a gearbox 80 to together drive the LP shaft or spool 36, thus causing the LP shaft or spool 36 to rotate. Such thereby supports operation of the LP compressor 22 and/or rotation of the fan 38.

Moreover, although not depicted, the turbomachine may further include an electric machine assembly integrated with the power gear box 46 rotatably connecting the LP shaft 36 with the fan 38, or with the gearbox 80 rotatably connecting the first plurality of LP turbine rotor blades 72 and the second plurality of LP turbine rotor blades 74, or with both. As will be discussed in greater detail below, in certain exemplary embodiments, the turbofan engine 10 may include an electric machine assembly integrated into one or both of these gearboxes, e.g., to generate electrical power during operation of the turbofan engine 10, or alternatively, to add mechanical power to the turbofan engine 10 (e.g., during emergency operations or high power demand operations).

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbine fan engine 10 may instead be configured as any other suitable turbomachine including, e.g., any other suitable number of shafts or spools, and excluding, e.g., the power gearbox 46 and/or fan 38, etc. Accordingly, it will be appreciated that in other exemplary embodiments, the turbofan engine 10 may instead be configured as, e.g., a turbojet engine, a turboshaft engine, a turboprop engine, etc., and further may be configured as an aeroderivative gas turbine engine or industrial gas turbine engine.

Figure 2:
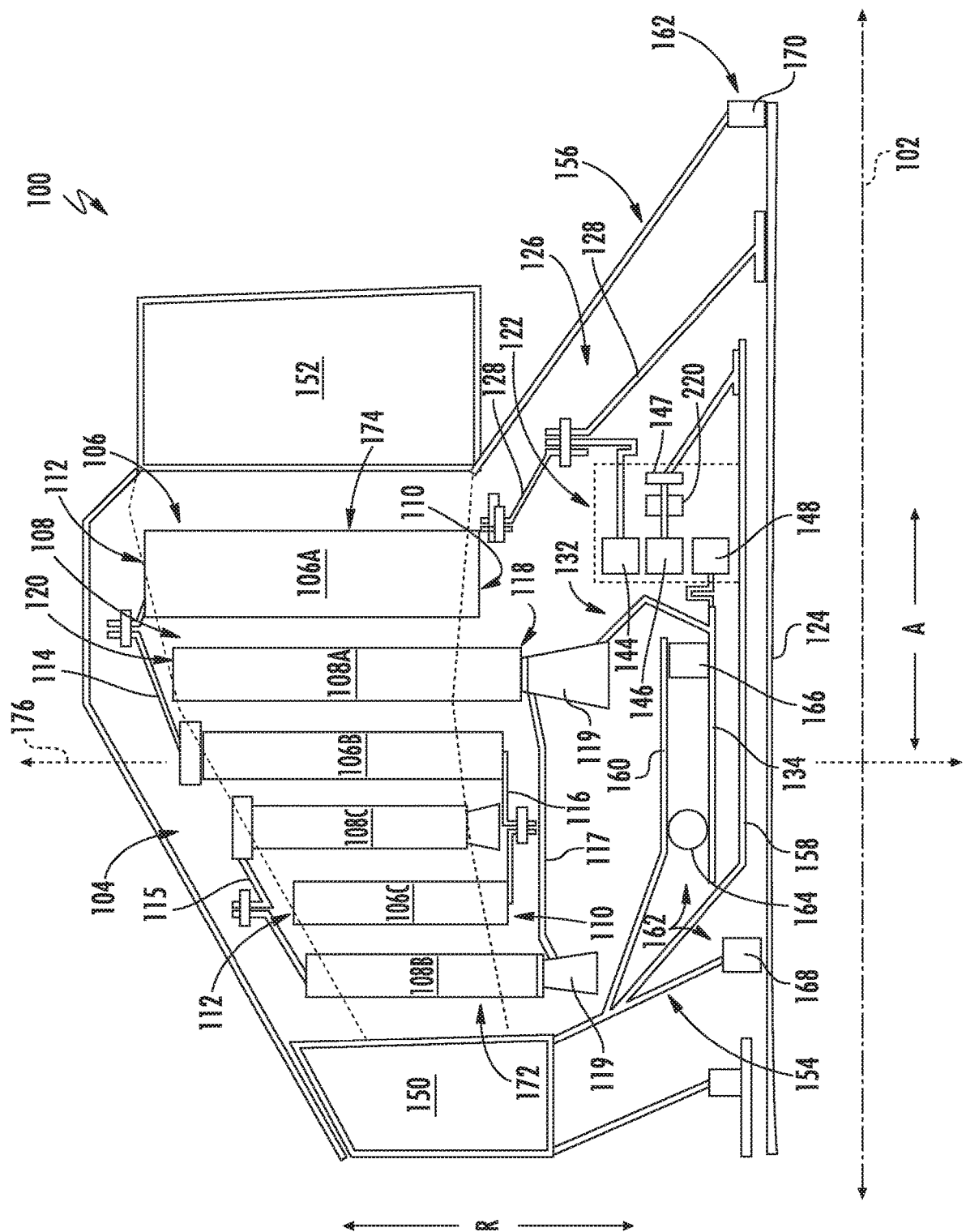
FIG. 2 is a close-up, schematic, cross sectional view of a turbine section in accordance with an exemplary aspect of the present disclosure.

Referring now to FIG. 2, a schematic, side, cross-sectional view is provided of a turbine section 100 of a turbomachine in accordance with an exemplary embodiment of the present disclosure. The exemplary turbine section 100 depicted in FIG. 2 may be incorporated into, e.g., the exemplary turbofan engine 10 described above with reference to FIG. 1. However, in other exemplary embodiments, the turbine section 100 may be integrated into any other suitable machine utilizing a turbine.

Accordingly, it will be appreciated that the turbomachine generally defines a radial direction R, an axial direction A, and a longitudinal centerline 102. Further, the turbine section 100 includes a turbine 104, with the turbine 104 of the turbine section 100 being rotatable about the axial direction A (i.e., includes one or more components rotatable about the axial direction A). For example, in certain embodiments, the turbine 104 may be a low pressure turbine (such as the exemplary low pressure turbine 30 of FIG. 1), or alternatively may be any other turbine (such as, a high pressure turbine, an intermediate turbine, a dual use turbine functioning as part of a high pressure turbine and/or a low pressure turbine, etc.).

Moreover, for the exemplary embodiment depicted, the turbine 104 includes a plurality of turbine rotor blades spaced along the axial direction A. More specifically, for the exemplary embodiment depicted, the turbine 104 includes a first plurality of turbine rotor blades 106 and a second plurality of turbine rotor blades 108. As will be discussed in greater detail below, the first plurality of turbine rotor blades 106 and second plurality of turbine rotor blades 108 are alternatingly spaced along the axial direction A.

Referring first to the first plurality of turbine rotor blades 106, each of the first plurality of turbine rotor blades 106 extends generally along the radial direction R between a radially inner end 110 and a radially outer end 112. Additionally, the first plurality of turbine rotor blades 106 includes a first turbine rotor blade 106A, a second turbine rotor blade 106B, and a third turbine rotor blade 106C, each spaced apart from one another generally along the axial direction A. At least two of the first plurality of turbine rotor blades 106 are spaced from one another along the axial direction A and coupled to one another at the respective radially outer ends 112. More specifically, for the embodiment depicted, each of the first turbine rotor blade 106A, the second turbine rotor blade 106B, and the third turbine rotor blade 106C are coupled to one another through their respective radially outer ends 112. More specifically, still, each of the first turbine rotor blade 106A, the second turbine rotor blade 106B, and the third turbine rotor blade 106C of the first plurality of turbine rotor blades 106 are coupled at their respective radially outer ends 112 through an outer drum 114.

Further, the second plurality of turbine rotor blades 108, each also extend generally along the radial direction R between a radially inner end 118 and a radially outer end 120. Additionally, for the embodiment depicted, the second plurality of turbine rotor blades 108 includes a first turbine rotor blade 108A, a second turbine rotor blade 108B, and a third turbine rotor blade 108C, each spaced apart from another generally along the axial direction A. For the embodiment depicted, at least two of the second plurality of turbine rotor blades 108 are spaced from one another along the axial direction A and coupled to one another at the respective radially inner ends 118 through the inner drum 116.

It should be appreciated that the first plurality of turbine rotor blades 106 and/or the second plurality of turbine rotor blades 108 may be coupled together in any suitable manner, and that as used herein, "coupled at the radially inner ends" and "coupled at the radially outer ends" refers generally to any direct or indirect coupling means or mechanism to connect the respective components. For example, in certain exemplary embodiments, the second plurality of turbine rotor blades 108 may include multiple stages of rotors (not shown) spaced along the axial direction A, with the first turbine rotor blade 108A, the second turbine rotor blade 108B, and the third turbine rotor blade 108C coupled to the respective stages of rotors at the respectively radially inner ends 118 through, e.g. dovetail base portions. The respective stages of rotors may, in turn, be coupled together to therefore "couple the second plurality of turbine rotor blades 108 at their respective radially inner ends 118."

Referring still to the embodiment depicted in FIG. 2, as stated, the first plurality of turbine rotor blades 106 and the second plurality of turbine rotor blades 108 are alternatingly spaced along the axial direction A. As used herein, the term "alternatingly spaced along the axial direction A" refers to the second plurality of turbine rotor blades 108 including at least one turbine rotor blade positioned along the axial direction A between two axially spaced turbine rotor blades of the first plurality of turbine rotor blades 106. For example, for the embodiment depicted, alternatingly spaced along the axial direction A refers to the second plurality of turbine rotor blades 108 including at least one turbine rotor blade positioned between the first and second turbine rotor blades 106A, 106B of the first plurality of turbine rotor blades 106 along the axial direction A, or between the second and third turbine rotor blades 106B, 106C of the first plurality of turbine rotor blades 106 along the axial direction A. More specifically, for the embodiment depicted, the first turbine rotor blade 106A of the first plurality of turbine rotor blades 106 is positioned aft of the first turbine rotor blade 108A of the second plurality of turbine rotor blades 108; the second turbine rotor blade 106B of the first plurality of turbine rotor blades 106 is positioned between the first and second turbine rotor blades 108A, 108B of the second plurality of turbine rotor blades 108; and the third turbine rotor blade 106C of the first plurality of turbine rotor blades 106 is positioned between the second and third turbine rotor blades 108B, 108C of the second plurality of turbine rotor blades 108.

Notably, however, in other exemplary embodiments, the first plurality of turbine rotor blades 106 may have any other suitable configuration and/or the second plurality of turbine rotor blades 108 may have any other suitable configuration. For example, in other exemplary embodiments, the first and/or second pluralities of turbine rotor blades 106, 108 may be configured in a split drum configuration. More specifically, in certain alternative exemplary embodiments, the radially outer end 112 of the first turbine rotor blade 106A may be coupled to the radially outer end 112 of the second turbine rotor blade 106B, and a radially inner end 110 of the second turbine rotor blade 106B may be coupled to the a radially inner end 110 of the third turbine rotor blade 106C. With such an exemplary embodiment, the first turbine rotor blade 106A and second turbine rotor blade 106B of the first plurality of turbine rotor blades 106 may be coupled through a first outer drum, and further the second turbine rotor blade 106B and the third turbine rotor blade 106C of the first plurality of turbine rotor blades 106 may be coupled through a first inner drum. Further, in certain of these alternative exemplary embodiments, with respect to the second plurality of turbine rotor blades 108, the radially inner end 118 of the first turbine rotor blade 108A may be coupled to the radially inner end 118 of the third turbine rotor blade 108C, and further the radially outer end 120 of the third turbine rotor blade 108C may be coupled to the radially outer end 120 of the second turbine rotor blade 108B. With such an exemplary embodiment, the first turbine rotor blade 108A and third turbine rotor blade 108C may be coupled through a second inner drum, and the third turbine rotor blade 108C and the second turbine rotor blade 108B may be coupled through a second outer drum.

In still other exemplary embodiments, the first plurality of turbine rotor blades 106 and the second plurality of turbine rotor blades 108 may have any other suitable configuration.

It will further be appreciated that for the embodiments described herein, the first turbine rotor blade 106A, second turbine rotor blade 106B, and third turbine rotor blade 106C of the first plurality of turbine rotor blades 106 generally represent a first stage of turbine rotor blades, a second stage of turbine rotor blades, and a third stage of turbine rotor blades, respectively. It will similarly be appreciated that the first turbine rotor blade 106A, second turbine rotor blade 106B, and third turbine rotor blade 108C of the second plurality of turbine rotor blades 108 each also generally represent a first stage of turbine rotor blades, a second stage of turbine rotor blades, and a third stage of turbine rotor blades, respectively. However, in other exemplary embodiments, the first plurality of turbine rotor blades 106 and/or the second plurality of turbine rotor blades 108 may include any other suitable number of stages of turbine rotor blades, such as two stages, four stages, etc., and further that in certain exemplary embodiments, the turbine 104 may additionally include one or more stages of stator vanes.

Figure 3:
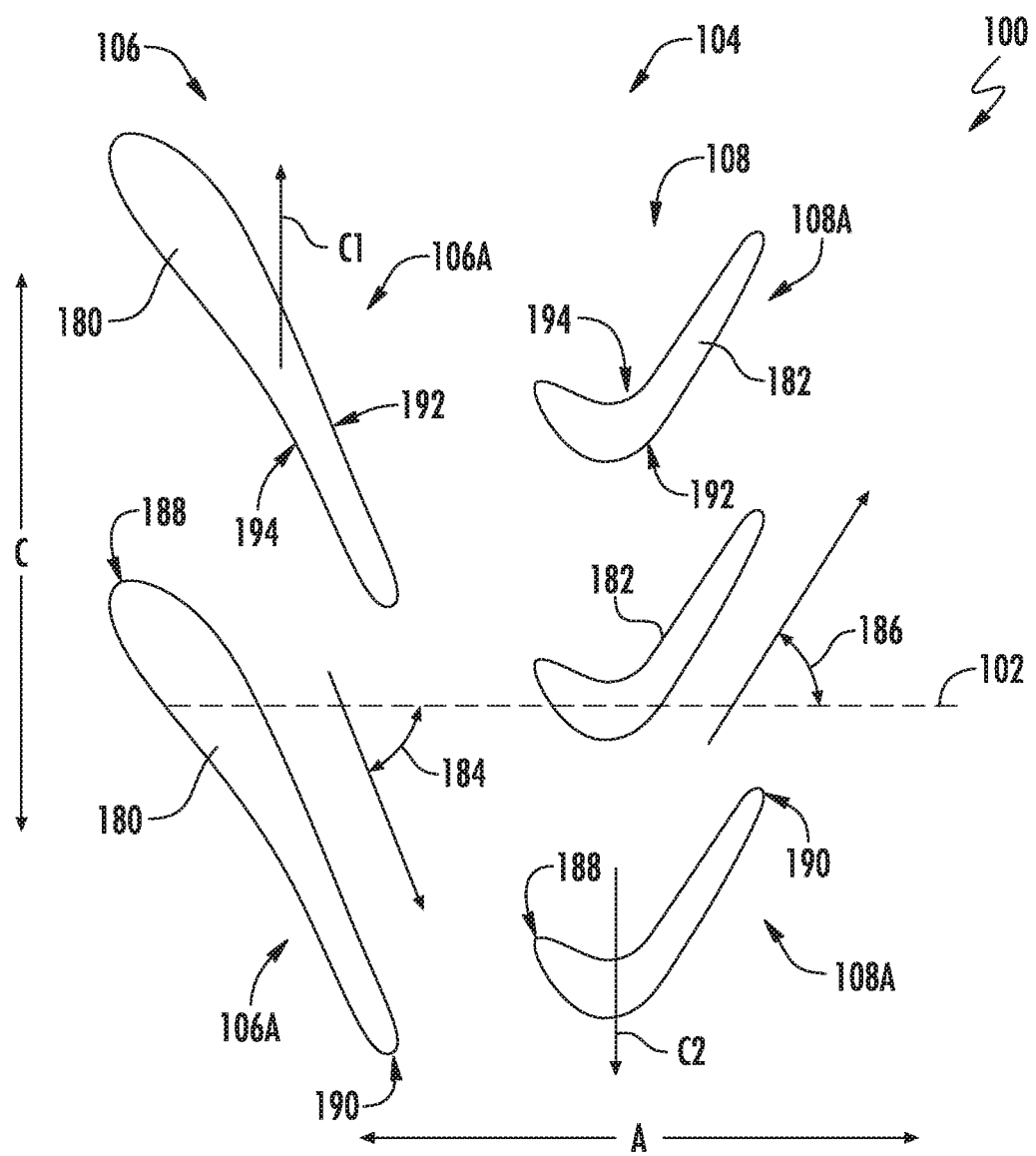
FIG. 3 is cross sectional view depicting exemplary blade pitch angles of a turbine of a turbine section in accordance with an exemplary embodiment of the present disclosure.

Referring now briefly to FIG. 3, an exemplary orientation of the first plurality of turbine rotor blades 106 and the second plurality of turbine rotor blades 108 is generally provided. More specifically, FIG. 3 depicts a first stage of turbine rotor blades 106A of the first plurality of turbine rotor blades 106 and a first stage of turbine rotor blades 108A of the second plurality of turbine rotor blades 108. In at least certain exemplary embodiments, the first plurality of turbine rotor blades may be configured to rotate in a first circumferential direction C1, while the second plurality of turbine rotor blades may be configured to rotate in a second circumferential direction C2.

It will be appreciated that for the embodiment depicted in FIG. 3, each of the turbine rotor blades 106A of the first plurality of turbine rotor blades 106 include an airfoil 180, and similarly, each of the turbine rotor blades 108A of the second plurality of turbine rotor blades 108 include an airfoil 182. The airfoils 180 each define an exit angle 184, and similarly the airfoils 182 each define an exit angle 186. The exit angles 184, 186 each represent an angular relationship of a longitudinal centerline 102 (i.e., of the turbomachine within which they are installed) to an exit direction of the gases flowing from an upstream end 188 towards a downstream end 190 of the respective airfoils 180, 182. For the embodiment depicted, the exit angle 184 may be a negative angle, such as a negative acute angle, while the exit angle 186 may be a positive angle, such as a positive acute angle ("positive" and "negative" being used herein to denote a relative value of the respective exit angles 184, 186 viewed from the same perspective). Notably, the exit angles 184, 186 of the airfoils 180, 182, respectively, a cause the first plurality of turbine rotor blades 106 and second plurality of turbine rotor blades 108 to rotate in the first and second circumferential directions C1, C2, respectively.

Referring still to FIG. 3, the airfoils 180, 182 may each further include a suction side 192 and a pressure side 194. The suction side 192 of the airfoils 180 are configured as convex toward the first circumferential direction C1 and the pressure side 194 of the airfoils 180 are configured as concave toward the first circumferential direction C1. The suction side 192 of the airfoils 182 are configured as convex toward the second circumferential direction C2 and the pressure side 194 of the airfoils 180 are configured as concave toward the second circumferential direction C2. Such a configuration may further result in the first plurality of turbine rotor blades 106 and second plurality of turbine rotor blades 108 rotating in the first and second circumferential directions C1, C2, respectively.

Referring now back to the exemplary turbine section 100 depicted in FIG. 2, the turbomachine further includes a gearbox 122, a spool 124 (which in at least certain exemplary embodiments may be configured as the exemplary low pressure spool 36 described above with reference to FIG. 1), and a bearing assembly 162. Further, the turbine section 100 additionally includes a turbine center frame 150, a turbine rear frame 152, and various support assemblies to connect and support the various rotatable components and stationary components within the turbine section 100. Specifically, for the embodiment of FIG. 2, the turbine section 100 additionally includes a first support member assembly 126 having a first support member 128, a second support member assembly 132 having a second support member 134, a center frame support assembly 154 having a radially inner center frame support member 158 and a radially outer center frame support member 160, and a rear frame support assembly 156.

The first support member 128 of the first support member assembly 126 generally extends between the first plurality of turbine rotor blades 106 and the spool 124, and more particularly, couples the radially inner end 110 of the first turbine rotor blade 106A of the first plurality of turbine rotor blades 106 to the spool 124. In such a manner, it will be appreciated that for the embodiment depicted, the first plurality of turbine rotor blades 106 is configured as a plurality of low-speed turbine rotor blades, while the second plurality of turbine rotor blades 108 is configured as a plurality of high-speed turbine rotor blades. Such may be due to the gearing of the gearbox 122 and the fact that the first plurality of turbine rotor blades 106 are directly rotatable with the spool 124 (which may limit a rotational speed of the first plurality of turbine rotor blades 106). Additionally, the second support member 134 of the second support member assembly 132 is coupled to the second plurality of turbine rotor blades 108, or more particularly, is coupled to the radially inner end 118 of the first turbine rotor blade 108A of the second plurality of turbine rotor blades 108 for the embodiment depicted.

Notably, however, in other exemplary embodiments, the first support member 128 may couple to any of the other turbine rotor blades within the first plurality of turbine rotor blades 106 at a radially inner end 110 (either directly or through, e.g., a rotor—not shown), and similarly, the second support member 134 may couple to any of the other turbine rotor blades of the second plurality of turbine rotor blades 108 at a radially inner end 118 (either directly or through, e.g., a rotor—not shown).

Moreover, the bearing assembly 162 is provided to allow the various support assemblies to rotatably support one another. Specifically, for the embodiment depicted, the bearing assembly 162 includes a first bearing 164, a second bearing 166, a third bearing 168, and a fourth bearing 170. The first bearing 164 and the second bearing 166 each rotatably support the second plurality of turbine rotor blades 108 through the second support member 134, and are each supported by the radially outer center frame support member 160 of the center frame support assembly 154. Additionally, the third bearing 168 and the fourth bearing 170 of the bearing assembly 162 each rotatably support the spool 124, and are supported by the turbine center frame 150 and the turbine rear frame 152, respectively. As is depicted schematically, for the embodiment depicted the first bearing 164 is configured as a ball bearing and the second bearing 166, third bearing 168, and fourth bearing 170 are each configured as a roller bearings. However, in other exemplary embodiments, the first bearing 164, second bearing 166, third bearing 168, and fourth bearing 170 may instead be configured in any other suitable manner, such as the other of a roller bearing or ball bearing, or alternatively, as a tapered roller bearing, an air bearing, etc. Further, in other exemplary embodiments, the bearing assembly 162 may have any other suitable configuration, including any other suitable placement of the bearings and number of bearings.

As will further be appreciated, for the exemplary turbine section 100 depicted in FIG. 2, the first plurality of turbine rotor blades 106 and the second plurality of turbine rotor blades 108 are rotatable with one another through the gearbox 122. The gearbox 122 is aligned with, or positioned aft of, a midpoint 176 of the turbine 104 for the embodiment depicted. Notably, as used herein, the term "aligned with," with reference to the axial direction A, refers to the two components and/or positions having at least a portion of the same axial position. Additionally, the term "midpoint" refers generally to an axial location halfway between a forward-most forward edge of a forward-most turbine rotor blade of the turbine 104 and an aft-most aft edge of an aft-most turbine rotor blade of the turbine 104. Accordingly, for the embodiment depicted, the midpoint 176 of the turbine 104 is an axial location halfway between a forward-most forward edge 172 of the third turbine rotor blade 108C of the second plurality of turbine rotor blades 108 and an aft-most aft edge 174 of the first turbine rotor blade 106A of the first plurality of turbine rotor blades 106.

It should be appreciated, however, that in other exemplary embodiments, the gearbox 122 may be positioned at any other suitable location. For example, in other exemplary embodiments, the gearbox 122 may instead be positioned forward of the midpoint 176 of the turbine 104.

Referring still to FIG. 2, the exemplary gearbox 122 depicted generally includes a ring gear 144, a sun gear 148, a planet gear 146 (or rather a plurality of planet gears 146), and a planet gear carrier. Each of the plurality of planet gears 146 are rotatably coupled to the planet gear carrier 147, as will be described in greater detail below. A first rotatable component of the turbomachine, a second rotatable component of the turbomachine, and a stationary component of the turbomachine are each couple to one of the ring gear 144, the sun gear 148, or the planet gears 146 such that the first rotatable component is rotatable with the second rotatable component through the gearbox 122. More particularly, for the embodiment depicted, the first rotatable component is the first plurality of turbine rotor blades 106, the second rotatable component is the second plurality of turbine rotor blades 108, and the stationary component is one of the forward turbine frame 150 or rear turbine frame 152. Accordingly, for the embodiment depicted, the first plurality of turbine rotor blades 106, the second plurality of turbine rotor blades 108, and one of the turbine center frame 150 or turbine rear frame 152 are each coupled to one of the ring gear 144, the sun gear 148, and the planet gears 146 (e.g., through the planet gear carrier 147) such that the first plurality of turbine rotor blades 106 is rotatable with the second plurality of turbine rotor blades 108 through the gearbox 122. More specifically, still, for the embodiment depicted, the ring gear 144 is coupled to the first plurality of turbine rotor blades 106, the sun gear 148 is coupled to the second plurality of turbine rotor blades 108, and the planet gears 146 are coupled to the turbine center frame 150 (through the planet gear carrier 147).

Further, for the embodiment depicted, the first support member 128 couples the first plurality of turbine rotor blades 106 to the ring gear 144 of the gearbox 122. Additionally, the second support member 134 similarly couples the second plurality of turbine rotor blades 108, or rather the radially inner end 118 of the first turbine rotor blade 108A of the second plurality of turbine rotor blades 108, to sun gear 148 of the gearbox 122. The plurality of planet gears 146 and planet gear carrier 147 are coupled to the center frame support assembly 154, and more particularly, to the radially outer center frame support member 160 of the center frame support assembly 154.

In such a manner, it will be appreciated that for the embodiment depicted, the first plurality of turbine rotor blades 106 are configured to rotate in an opposite direction than the second plurality of turbine rotor blades 108. For example, the first plurality of turbine rotor blades 106 may be configured to rotate in a first circumferential direction C1 (see FIG. 3), while the second plurality of turbine rotor blades 108 may be configured to rotate in a second circumferential direction C2 (see FIG. 3), opposite the first circumferential direction C1. It should be understood, however, that although the structures provided herein therefore enable the turbine 104 to "counter-rotate," in other embodiments, the turbine 104 may instead be configured to "co-rotate," wherein the first plurality of turbine rotor blades 106 and the second plurality of turbine rotor blades 108 each rotate the same circumferential direction.

It should further be understood that the first circumferential direction C1 and the second circumferential direction C2 as used and described herein are intended to denote directions relative to one another. Therefore, the first circumferential direction C1 may refer to a clockwise rotation (viewed from downstream looking upstream) and the second circumferential direction C2 may refer to a counter-clockwise rotation (viewed from downstream looking upstream). Alternatively, the first circumferential direction C1 may refer to a counter-clockwise rotation (viewed from downstream looking upstream) and the second circumferential direction C2 may refer to a clockwise rotation (viewed from downstream looking upstream).

Figure 4:
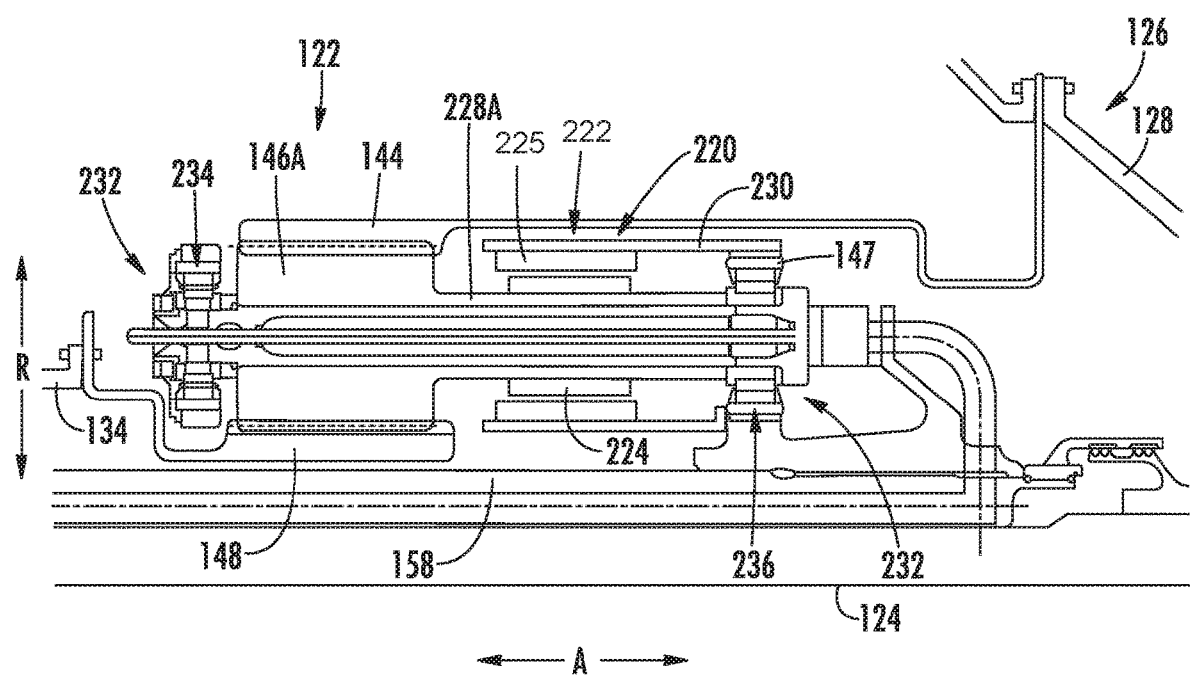
FIG. 4 is a close-up, schematic view of a gearbox and electric machine assembly in accordance with an exemplary embodiment of the present disclosure, incorporated in the turbine section of FIG. 2.

Moreover, referring still to FIG. 2, and now also to FIG. 4, it will be appreciated that the turbomachine further includes an electric machine assembly 220 integrated with the gearbox 122. Notably, FIG. 4 provides a close-up, cross-sectional, schematic view of a portion of the exemplary gearbox 122 and electric machine assembly 220 of FIG. 2.

As is depicted, the electric machine assembly 220 generally includes a first electric machine 222, the first electric machine 222 including a first rotor 224 and a first stator 225. The first rotor 224 is coupled to one of the ring gear 144, the planet gear 146, or the sun gear 148 of the gearbox 122 such that the first rotor 224 rotates relative to the first stator 225 during operation of the turbomachine.

More specifically, referring particularly to FIG. 4, it will be appreciated that the planet gear 146 depicted, which may be a first planet gear 146A, defines a local axis 226A and is rotatably coupled to the planet gear carrier 147 such that it is rotatable about its local axis 226A. Further, the first rotor 224 of the first electric machine 222 is coupled to the first planet gear 146A such that the first rotor 224 is rotatable about the local axis 226A of the first planet gear 146A with the first planet gear 146A. More particularly still, for the embodiment depicted, the first planet gear 146A is coupled to a first planet gear shaft 228A, the first planet gear shaft 228A extending along the local axis 226A of the first planet gear 146A. The first rotor 224 of the first electric machine 222 is coupled to the first planet gear shaft 228A, such that rotation of the first planet gear 146A correspondingly rotates the first rotor 224.

By contrast, the first stator 225 of the first electric machine 222 is fixed relative to the planet gear carrier 147. Specifically, for the embodiment depicted, the first electric machine 222 includes a mount 230 extending from the planet gear carrier 147 to the first stator 225 to fix the first stator 225 in position. In such a manner, the first rotor 224 of the first electric machine 222 is configured to rotate relative to the first stator 225 of the first electric machine 222 during operation of the turbomachine.

As stated, for the embodiment depicted, the electric machine assembly 220, including the first electric machine 222, is integrated into the gearbox 122. For example, for the embodiment depicted, the gearbox 122 includes a first planet gear bearing assembly 232. The first planet gear 146A and first planet gear shaft 228A are together rotatably supported substantially completely by the first planet gear bearing assembly 232. The first planet gear bearing assembly 232 generally includes a first bearing 234 positioned forward of the first planet gear 146A and the first rotor 224 of the first electric machine 222 and a second bearing 236 positioned aft of the first planet gear 146A and the first rotor 224 of the first electric machine 222. The first bearing 234 and the second bearing 236 are, for the embodiment depicted, the only bearings of the first planet gear bearing assembly 232.

It will be appreciated that integrating the electric machine assembly 220 into the gearbox 122 may allow for an overall reduction in size and weight of the two components, as the two components are sharing use of certain components. Additionally, coupling the first rotor 224 of the first electric machine 222 to the first planet gear 146A may result in a more efficient electric machine 222, as the relatively high rotational speeds of the first planet gear 146A may provide the first electric machine 222 with a desired rotor tip speed for efficient operation.

Figure 5:
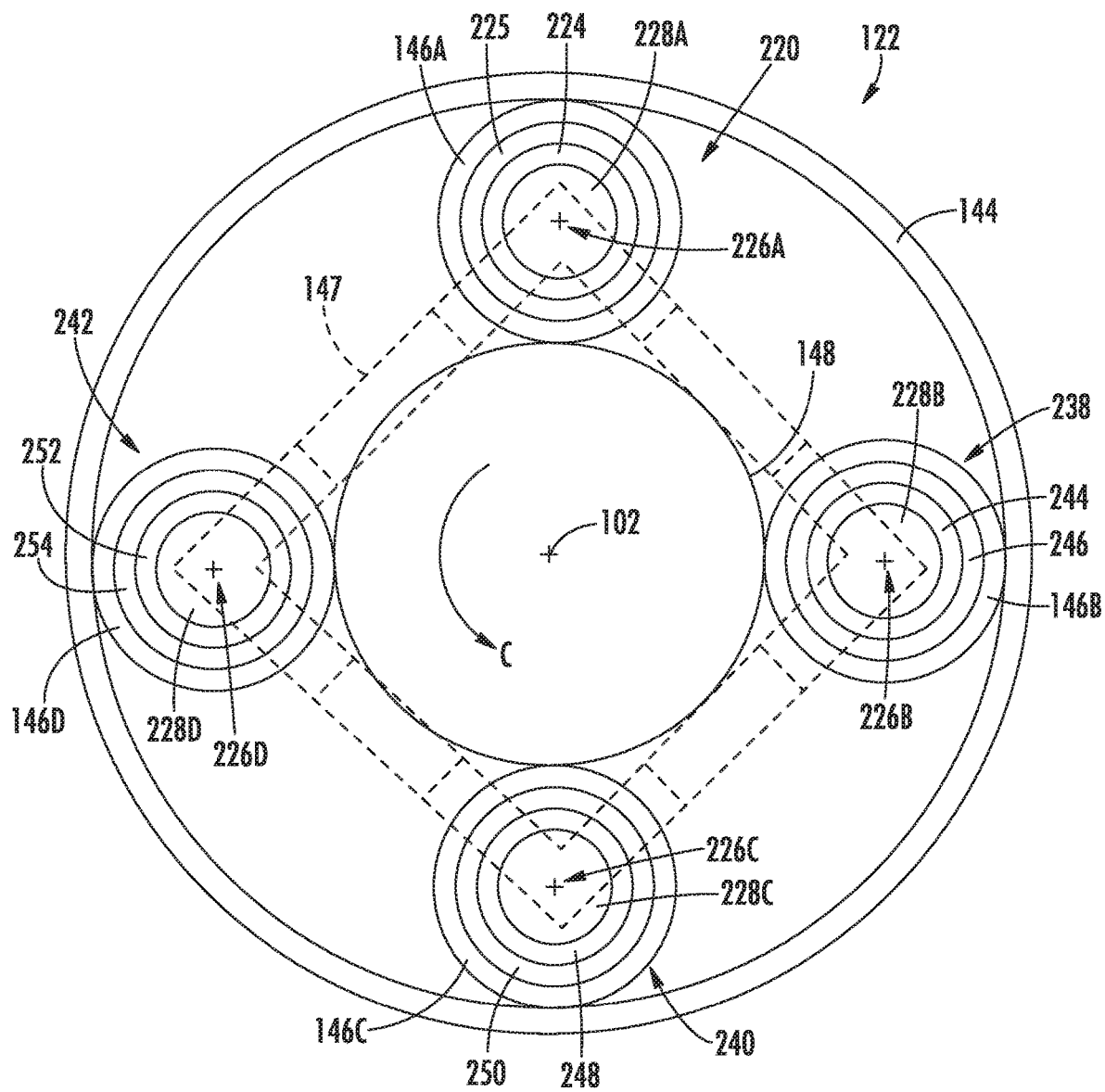
FIG. 5 is a schematic, axial view of the gearbox and electric machine assembly of FIG. 4.

Referring now also to FIG. 5, an axial view of the gearbox 122 and electric machine assembly 220 described above with reference to FIG. 4 is provided. As is depicted, the gearbox 122 includes a plurality of planet gears 146, and the electric machine assembly 220 further includes a plurality of rotors and a plurality of stators. Each of the plurality of rotors is coupled to one of the planet gears 146 of the plurality of planet gears 146 such that each rotor is rotatable about the local axis 226 of the respective planet gear 146 with the respective planet gear 146.

More specifically, for the embodiment of FIG. 5, the gearbox 122 includes four planet gears 146 and the electric machine assembly 220 includes four electric machines. Specifically, the plurality of planet gears 146 includes the first planet gear 146A, a second planet gear 146B, a third planet gear 146C, and a fourth planet gear 146D, and similarly the electric machine assembly 220 includes the first electric machine 222, a second electric machine 238, a third electric machine 240, and a fourth electric machine 242. Each of the planet gears 146A, 146B, 146C, 146D defines a respective local axis 226A, 226B, 226C, 226D and is rotatably coupled to the planet gear carrier 147 (depicted in Phantom in FIG. 5 for clarity), such that it may rotate relative to the planet gear carrier 147 about its respective local axis 226A, 226B, 226C, 226D.

Further, each of the electric machines 238, 240, 242 of the electric machine assembly 220 may be configured in a similar manner as the first electric machine 222 described above with reference to FIG. 4. For example, as stated, the first electric machine 222 includes the first rotor 224 coupled to the first planet gear 146A and the first stator 225 fixed to the planet gear carrier 147. Similarly, the second electric machine 238 includes a second rotor 244 coupled to the second planet gear 146B and a second stator 246 coupled to the planet gear carrier 147; the third electric machine 240 includes a third rotor 248 coupled to the third planet gear 146C and a third stator 250 coupled to the planet gear carrier 147; and the fourth electric machine 242 includes a fourth rotor 252 coupled to the fourth planet gear 146 and a fourth stator 254 coupled to the planet gear carrier 147. More specifically, for the embodiment depicted, each of the planet gears 146A, 146B, 146C, 146D includes a respective planet gear shaft 228A, 228B, 228C, 228D extending along the respective local axis 226A, 226B, 226C, 226D of the respective planet gear 146A, 146B, 146C, 146D and the rotors 224, 244, 248, 252 of the respective electric machines 222, 238, 240, 242 are coupled to the respective planet gear shafts 228A, 228B, 228C, 228D.

Figure 6:
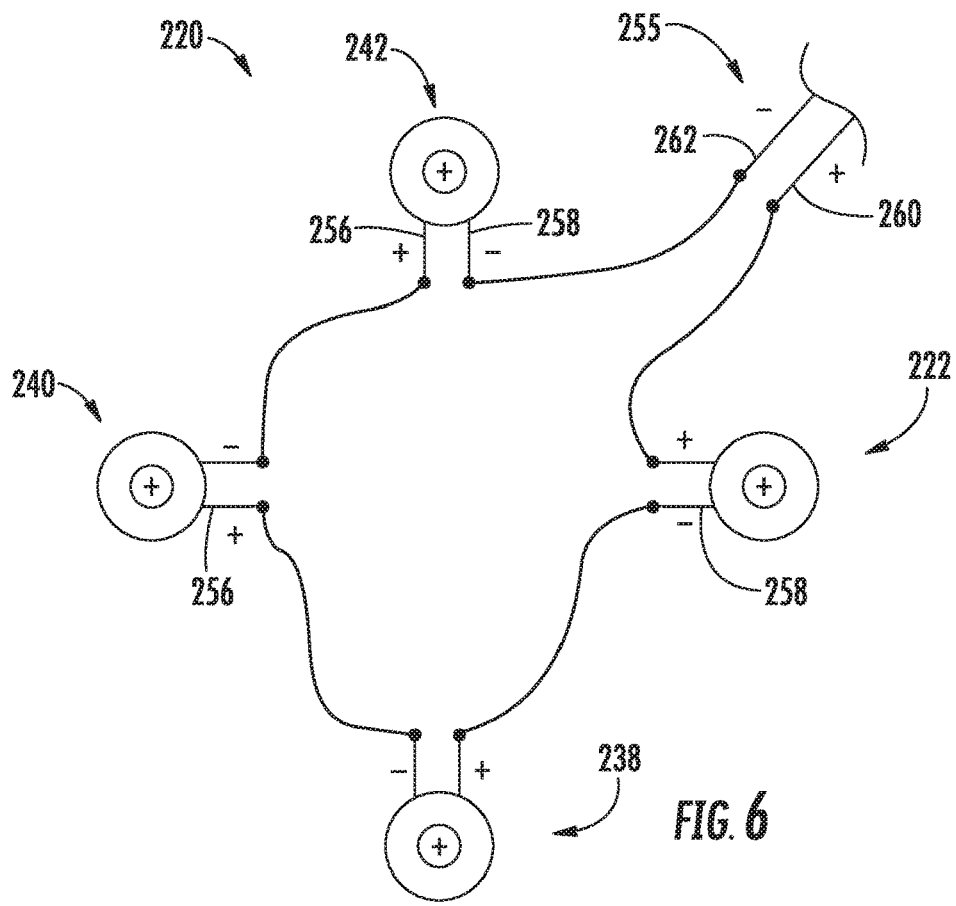
FIG. 6 is a schematic view of an electrical connection of various components within the electric machine assembly of FIG. 4 in accordance with an exemplary embodiment of the present disclosure.

Referring now to FIG. 6, a schematic view of the exemplary electric machine assembly 220 described above with reference to, e.g., FIG. 5 is provided. As is depicted, the electric machine assembly 220 further includes a main electric line 255, and FIG. 6 depicts schematically an electrical connection between each of the plurality of electric machines (i.e., the first electric machine 222, the second electric machine 238, the third electric machine 240, and the fourth electric machine 242) of the exemplary electric machine assembly 220 described above and to the main electric line 255. For the embodiment depicted, each of the plurality of electric machines 222, 238, 240, 242 generally includes a positive terminal 256 and a negative terminal 258. Further, each of the plurality of electric machines 222, 238, 240, 242 are electrically connected in series with one another and the main electric line 255. Specifically, for the embodiment depicted, the negative terminal 258 of the first electric machine 222 is electrically connected to the positive terminal 256 of the second electric machine 238, the negative terminal 258 of the second electric machine 238 is electrically connected to the positive terminal 256 of the third electric machine 240, and the negative terminal 258 of the third electric machine 240 is electrically connected to the positive terminal 256 of the fourth electric machine 242. Further, for the embodiment depicted, the main electric line 255 includes a positive electric line 260 and a negative electric line 262. The negative terminal 258 of the fourth electric machine 242 is electrically connected to the negative electric line 262 of the main electric line 255 and the positive terminal 256 of the first electric machine 222 is electrically connected to the positive electric line 260 of the main electric line 255.

It will be appreciated that inclusion of the plurality of electric machines 222, 238, 240, 242 configured in such an exemplary embodiment may allow for the electric machine assembly 220 to provide electrical power through the main electric line 255 at, e.g., a relatively high voltage. For example, for the embodiment depicted, connecting the electric machines 222, 238, 240, 242 in series may allow for the electric machine assembly 220 to provide electrical power at a voltage approximately four times greater than a voltage of an individual one of the electric machines. It should be appreciated that such may be beneficial when, e.g., the electrical power generated is provided to electrical power sinks across an aircraft. More specifically, transferring the electrical power at higher voltages may allow for use of smaller and lighter electrical lines (as compared to electrical lines configured to transfer the same wattage at a higher current), which may result in an overall lighter propulsion system for the aircraft.

Figure 7:
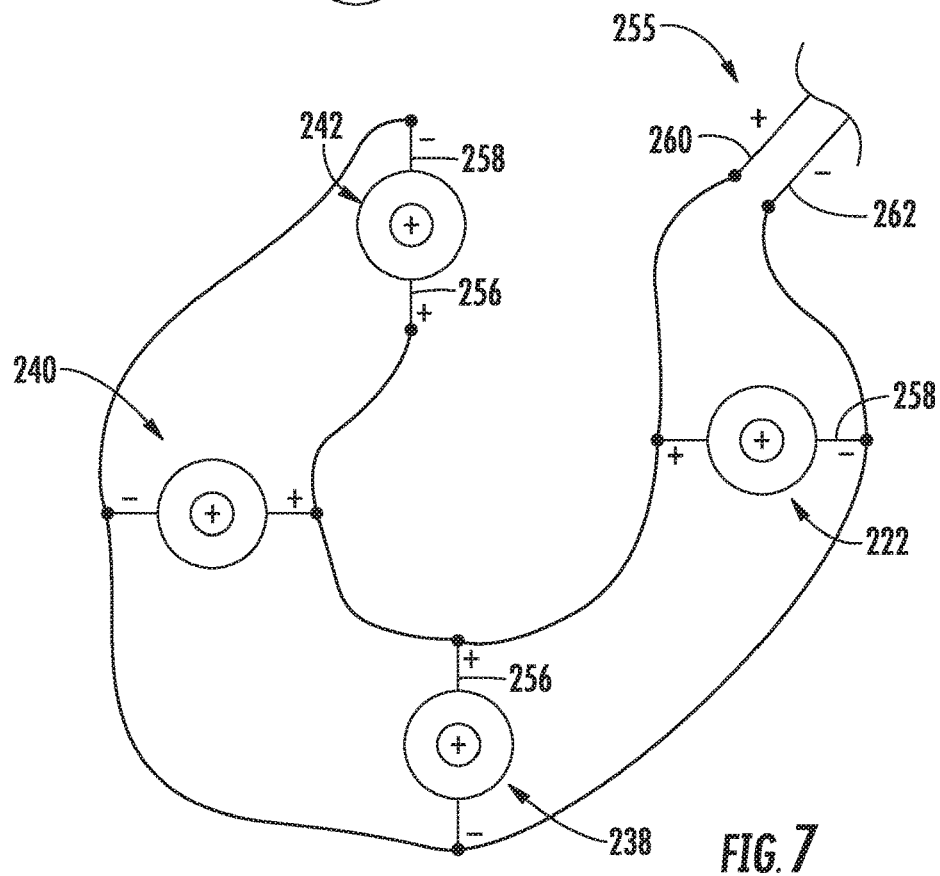
FIG. 7 is a schematic view of an electrical connection of various components within an electric machine assembly in accordance with another exemplary embodiment of the present disclosure.

It will be appreciated, however, that in other exemplary embodiments, the plurality of electric machines 222, 238, 240, 242 may instead be electrically coupled together and with the main electric line 255 in any other suitable manner. For example, referring now briefly to FIG. 7, an alternative exemplary embodiment of the exemplary electric machine assembly 220 described above with reference to, e.g., FIGS. 4 and 5 is depicted. The exemplary electric machine assembly 220 of FIG. 7 may be configured in substantially the same manner as exemplary electric machine assembly 220 described above with reference to FIG. 6. For example, the exemplary electric machine assembly 220 of FIG. 7 generally includes a plurality of electric machines (i.e., a first electric machine 222, a second electric machine 238, a third electric machine 240, and a fourth electric machine 242), with each electric machine including a positive terminal 256 and a negative terminal 258. Additionally, the exemplary electric machine assembly 220 of FIG. 7 includes a main electric line 255 having a positive electric line 260 and a negative electric line 262. However, for the embodiment depicted, the plurality of electric machines 222, 238, 240, 242 are instead electrically connected in parallel with one another and with the main electric line 255. More specifically, the positive terminals 256 of each of the plurality of electric machines 222, 238, 240, 242 are connected together and to the positive electric line 260 of the main electric line 255. Further, the negative terminals 258 of each of the plurality of electric machines 222, 238, 240, 242 are connected together and to the negative electric line 262 of the main electric line 255.

It will be appreciated that inclusion of the plurality of electric machines 222, 238, 240, 242 configured in accordance with such an exemplary embodiment may result in a more robust electric machine assembly 220 having increased redundancy. Further, such a configuration may allow for the electric machine assembly 220 to provide electrical power at a higher current than would otherwise be possible. For example, for the embodiment depicted, connecting the electric machines 222, 238, 240, 242 in parallel may allow for the electric machine assembly 220 to provide electrical power at having a current approximately four times greater than a current electrical power generated by an individual one of the electric machines.

Notably, however, in other exemplary embodiments, the plurality of electric machines 222, 238, 240, 242 may be connected together and to the main electric line 260 in any other suitable manner. For example, in other exemplary embodiments, the plurality of electric machines 222, 238, 240, 242 of the electric machine assembly 220 may be connected together using a combination of parallel and series connections.

It will further be appreciated that the actual exemplary electric machine assembly 220 described above is provided by way of example only. For example, in other exemplary embodiments, the electric machine assembly 220 may not include each of the plurality of electric machines 222, 238, 240, 242, and instead may only include the first electric machine 222 having the first rotor 224 coupled to, e.g., the first planet gear 146A. Accordingly, using the nomenclature "first" electric machine does not imply that there necessarily are multiple electric machines within the electric machine assembly 220. Additionally, or alternatively, however, in still other exemplary embodiments, the gearbox 122 may include any other suitable number of planet gears 146, and further, the electric machine assembly 220 may include any other suitable number of electric machines (e.g., two, three, etc.).

Figure 8:
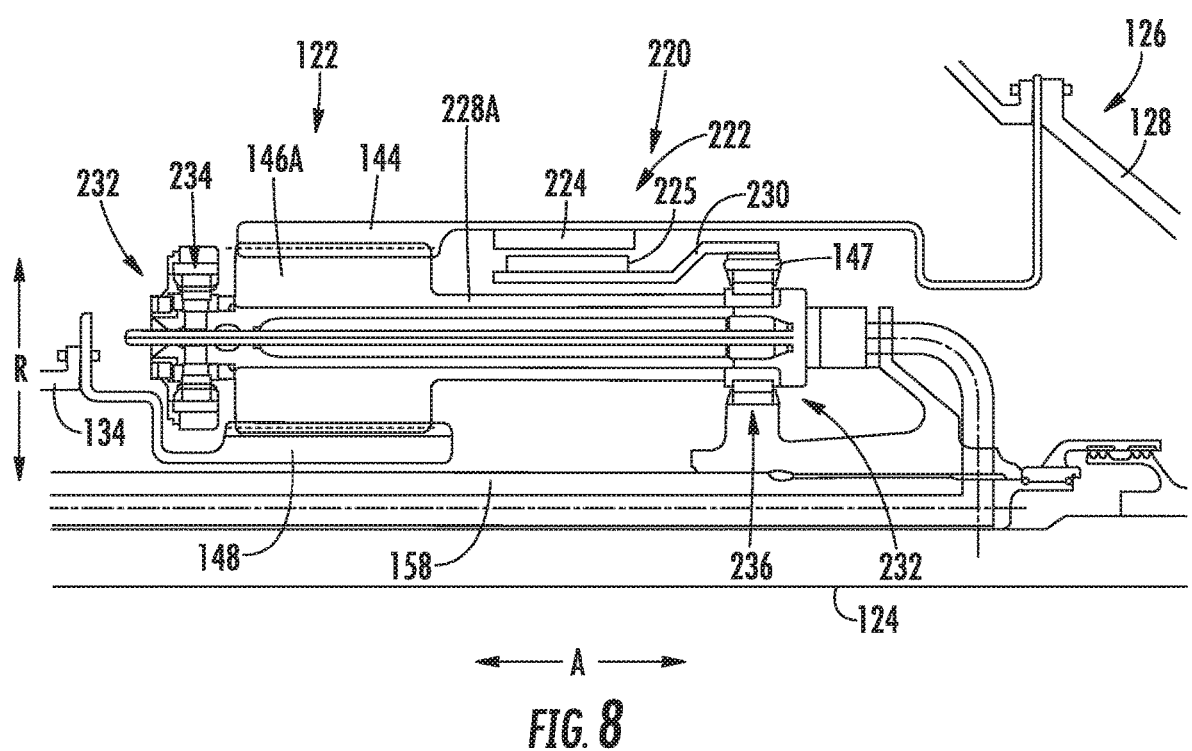
FIG. 8 is a close-up, schematic view of a gearbox and an electric machine assembly in accordance with another exemplary embodiment of the present disclosure.

Moreover, although for the embodiments described above with reference to, e.g., FIG. 4 the exemplary electric machine assembly 220 includes a first electric machine 222 having a first rotor 224 coupled to a first planet gear 146A, in other exemplary embodiments, the electric machine assembly 220 may additionally, or alternatively, include one or more electric machines with a rotor coupled to, e.g., a sun gear 148, a ring gear 144, or a planet gear carrier 147 (e.g., when one of the sun gear 148 or ring gear 144 is coupled to a stationery member). For example, referring briefly to FIG. 8, an alternative exemplary embodiment of the present disclosure is depicted. Specifically, FIG. 8 depicts a close-up, schematic, cross-sectional view of a gearbox 122 and an integrated electric machine assembly 220 in accordance with another example embodiment of the present disclosure. The exemplary gearbox 122 and electric machine assembly 220 of FIG. 8 may be configured in substantially the same manner as exemplary gearbox 122 and electric machine assembly 220 described above with reference to FIG. 4.

For example, the gearbox 122 generally includes a ring gear 144, a plurality of planet gears 146 coupled to a planet gear carrier 147, and a sun gear 148. The ring gear 144 is coupled to a first rotatable component (which may be a first plurality of turbine rotor blades 106), the sun gear 148 is coupled to a second rotatable component (which may be a second plurality of turbine rotor blades 108), and the plurality of planet gears 146 and planet gear carrier 147 are coupled to a stationary component (which may be a turbine center frame 150). Additionally, the electric machine assembly 220 includes a first electric machine 222 integrated with the gearbox 122.

However, for the embodiment of FIG. 8, a first rotor 224 of the first electric machine 222 is not rotatable with a first planet gear 146A, and instead, the first rotor 224 of the first electric machine 222 is coupled to and rotatable with one of the ring gear 144 or the sun gear 148. More particularly, for the embodiment of FIG. 8, the first rotor 224 of the first electric machine 222 is coupled to and rotatable with the ring gear 144. Similar to the embodiment above, a first stator 225 the first electric machine 222 is fixed to the planet gear carrier 147, such that the first rotor 224 of the first electric machine 222 rotates relative to the first stator 225 during operation of the turbomachine. Accordingly, it will be appreciated that with such an exemplary embodiment, the first electric machine 222 may be configured as an "outrunner" electric machine (as compared to the "inrunner" configuration of the electric machines 222, 238, 240, 242 of the electric machine assembly 220 described above with rooms to, e.g., FIG. 4).

It will further be appreciated that in at least certain exemplary embodiments of the present disclosure, an electric machine assembly 220 may be provided integrated into any other suitable gearbox 122 of a turbomachine having a first rotatable component, a second rotatable component, and a stationary component, wherein the first rotatable component, the second rotatable component and the stationary component are each coupled to one of a ring gear, a planet gear (through a planet gear carrier), or a sun gear of the gearbox such that the first rotatable component is rotatable with the second rotatable component through the gearbox. For example, in other exemplary embodiments, the turbomachine may include an electric machine assembly 220 integrated into, e.g., a power gearbox rotatably coupling a low pressure spool of the turbomachine to a fan shaft of a fan assembly of the turbomachine. For example, in certain exemplary embodiments, the electric machine assembly 220 may be integrated into the power gear box 46 of the exemplary turbomachine 10 described above with reference to FIG. 1, such that the first rotatable component is the low pressure spool 36 and the second rotatable component is the fan shaft of the fan assembly 38 of the exemplary turbofan engine 10 described above with reference to FIG. 1.

It will be appreciated that in at least certain exemplary embodiments, the electric machine assembly 220 may be a relatively powerful electric machine assembly 220 capable of generating a relatively large amount of electrical power and/or providing a relatively large amount of mechanical power. For example, in certain exemplary embodiments, wherein the electric machine assembly 220 is configured as an electric generator assembly (i.e., all electric machines of the electric machine assembly 220 are operating as electric generators to convert mechanical power into electrical power), the electric machine assembly 220 may be configured to generate between about one hundred (100) kilowatts of electrical power during operation of the turbomachine and about ten (10) megawatts of electrical power during operation of the turbomachine. For example, in certain exemplary embodiments, the electric machine assembly 220 may be configured to generate at least about two hundred (200) kilowatts of electrical power, such as at least about three hundred (300) kilowatts of electrical power, such as at least about four hundred (400) kilowatts of electrical power during operation of the turbomachine.

Further, in other exemplary embodiments, wherein the electric machine assembly 220 is configured as an electric motor assembly (i.e., all electric machines of the electric machine assembly 220 are operating to receive electrical power and convert such electrical power to mechanical power), the electric machine assembly 220 may be configured to provide between about one hundred and thirty (130) horsepower and about 13,000 horsepower of mechanical power to a first rotatable component of the turbomachine, a second rotatable component of the turbomachine, or both during operation. For example, in certain exemplary embodiments, the electric machine assembly 220 may be configured to provide at least about two hundred and sixty (260) horsepower, such as at least about three hundred and ninety (390) horsepower, such as at least about five hundred and twenty (520) horsepower during operation.

It will further be appreciated that in one or more of the above embodiments, the electric machine, or each electric machine, of the electric machine assembly 220 described herein may be any suitable type of electric machine. For example, in certain exemplary embodiments, the electric machine(s) may be alternating current ("AC") electric machine(s), direct current ("DC") electric machine(s), or some combination of the two. Further, in certain exemplary embodiments, one or more of the electric machine(s) may be one or more of: an asynchronous or induction electric machine(s) (such as a wound field electric machine), synchronous electric machine(s), permanent magnet electric machine(s), brushless electric machine(s), brushed electric machine(s), etc.

Figure 9:
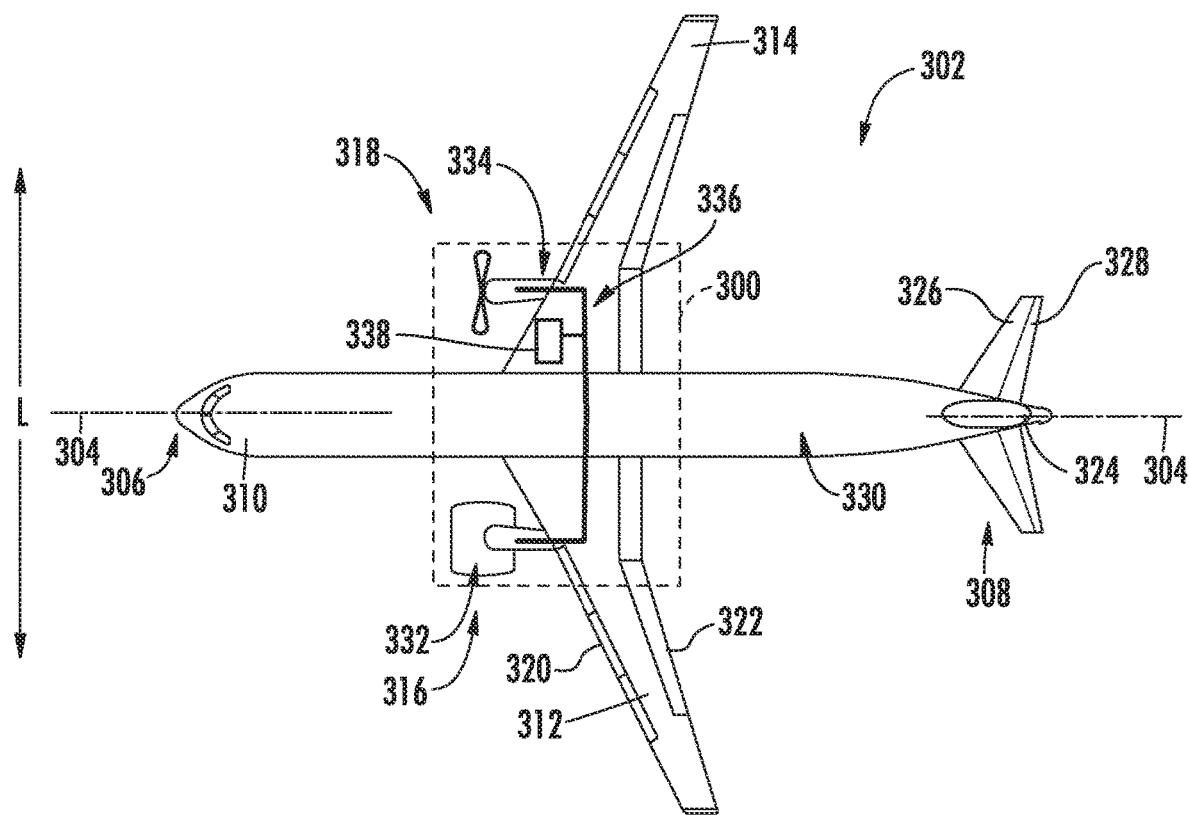
FIG. 9 is a top, schematic view of an aircraft including a propulsion system in accordance with an exemplary embodiment of the present disclosure.

With one or more of the above exemplary embodiments, the turbomachine including the gearbox 122 having the electric machine assembly 220 integrated therewith may be configured as part of a propulsion system 300. For example, referring now briefly to FIG. 9, a top, schematic view is provided of an exemplary aircraft 302 having a propulsion system 300 as may incorporate various embodiments of the present disclosure. As shown in FIG. 9, the aircraft 302 defines a longitudinal centerline 304 that extends therethrough, a lateral direction L, a forward end 306, and an aft end 308. Moreover, the aircraft 302 includes a fuselage 310, extending longitudinally from the forward end 306 of the aircraft 302 to the aft end 308 of the aircraft 302, a first wing 312, and a second wing 314. The first and second wings 312, 314 each extend laterally outward with respect to the longitudinal centerline 304. The first wing 312 and a portion of the fuselage 310 together define a first side 316 of the aircraft 302, and the second wing 314 and another portion of the fuselage 310 together define a second side 318 of the aircraft 302. For the embodiment depicted, the first side 316 of the aircraft 302 is configured as the port side of the aircraft 302, and the second side 318 of the aircraft 302 is configured as the starboard side of the aircraft 302.

Each of the wings 312, 314 for the exemplary embodiment depicted includes one or more leading edge flaps 320 and one or more trailing edge flaps 322. The aircraft 302 further includes a vertical stabilizer 324 having a rudder flap (not shown) for yaw control, and a pair of horizontal stabilizers 326, each having an elevator flap 328 for pitch control. The fuselage 310 additionally includes an outer surface or skin 330.

It will be appreciated, however, that the exemplary aircraft 302 is provided by way of example only and that in other exemplary embodiments, the aircraft 302 may have any other suitable configuration.

Additionally, as stated, the exemplary aircraft 302 includes the propulsion system 300. The propulsion system includes a first propulsor 332 and a second propulsor 334. The first propulsor 332 may be a turbomachine having a gearbox with an electric machine assembly integrated therewith. For example, the first propulsor 332 may be one or more of the exemplary turbofan engine 10 and turbomachines described above with reference to FIGS. 1 through 8, including the exemplary gearbox 80 or 122 having the electric machine assembly 220 integrated therewith. However, in other embodiments, the first propulsor 332 may include any other suitable turbomachine having a gearbox with an electric machine assembly in accordance with any of the other embodiments of the present disclosure integrated therewith.

The second propulsor 334 of the exemplary propulsion system 300 depicted is an electric propulsor (e.g., an electric fan having an electric motor driving a propeller/fan). More specifically, the propulsion system 300 further includes an electric bus 336 and an electric energy storage unit 338 (e.g., one or more batteries). The electric bus 336 electrically connects the electric propulsor to the electric machine assembly 220, and more specifically to the main electric line 255 (see, e.g., FIG. 6) of the electric machine assembly 220 of the first propulsor 332, and is further electrically connected to the electric energy storage unit 338. The electric bus 336 may selectively electrically connect the electric machine assembly 220 to the electric energy storage unit 338 and/or to the second propulsor 334 (i.e., the electric propulsor).

Accordingly, in certain embodiments, the electric machine assembly 220 may be electrically connectable to one or more electrical power components, such as the electric energy storage unit 338 or the electric propulsor (i.e., the second propulsor 334), for providing electrical power to, or receiving electrical power from, such electrical power component during operation of the turbomachine and propulsion system 300. For example, when the electrical power component is configured as the electric energy storage unit 338, the electric energy storage unit 338 may be configured to receive electrical power from the electric machine assembly 220 of the turbomachine during operation of the turbomachine. Additionally, or alternatively, during certain embodiments, the electric energy storage unit 338 may be configured to provide electrical power to the electric machine assembly 220 of the turbomachine during operation. For example, electrical power may be provided from the electric energy storage unit 338 to the electric machine assembly 220 to supplement an amount of power of the turbomachine is generating during certain operations, such as during certain high power operations, or alternatively, may be configured to drive the turbomachine, or a fan of the turbomachine, during emergency operations.

In other embodiments, however, the electrical power component may be the electric propulsor (i.e., the second propulsor 334). With such an embodiment, the electric machine assembly 220 may be configured to provide electrical power to the electric propulsor (i.e., the second propulsor 334), such that the electric propulsor generates thrust for the propulsion system 300 when the electric machine assembly 220 of the turbomachine provides electrical power to the electric propulsor (i.e., the second propulsor 334).

It will be appreciated, however, that in other exemplary embodiments, the propulsion system 300 may have any other suitable configuration. For example, in other exemplary embodiments, the propulsion system 300 may include a plurality of electric propulsors, with each such electric propulsors electrically coupled to the electric bus 336 (and electrically connectable to the electric machine assembly 220). Additionally, or alternatively, the propulsion system 300 may include any other suitable number of gas turbine engines, such as one or more of the exemplary turbomachines discussed herein, each of which including an electric machine assembly in accordance with one or more exemplary embodiments of the present disclosure. Further, the propulsion system 300 may arrange the electric propulsors and gas turbine engines in any suitable manner along, e.g., the first wing 312, the second wing 314, the aft end 308, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbomachine defining a radial direction and an axial direction, the turbomachine comprising:

a turbine section comprising a turbine, the turbine comprising a first plurality of turbine rotor blades and a second plurality of turbine rotor blades, the first plurality of turbine rotor blades and second plurality of turbine rotor blades alternatingly spaced along the axial direction;

a gearbox comprising a ring gear, a planet gear, and a sun gear, wherein the first plurality of turbine rotor blades and the second plurality of turbine rotor blades are each coupled to one of the ring gear, the planet gear, or the sun gear such that the first plurality of turbine rotor blades is rotatable with the second plurality of turbine rotor blades through the gearbox, wherein the gearbox further comprises a planet gear carrier; and an electric machine assembly comprising a rotor and a stator, the rotor of the electric machine coupled to one of the ring gear, the planet gear, or the sun gear of the gearbox such that the rotor rotates relative to the stator during operation of the turbomachine, wherein the planet gear carrier supports a mount cantilevered over and extending along the planet gear in an axial direction such that the mount and the planet gear overlap in a radial direction, the mount having the stator affixed thereto.

2. The turbomachine of claim 1, wherein the planet gear is rotatably coupled to the planet gear carrier such that it is rotatable about its local axis.

3. The turbomachine of claim 1, wherein the planet gear of the gearbox comprises a plurality of planet gears, wherein the gearbox further comprises a planet gear carrier, wherein each planet gear of the plurality of planet gears defines a local axis and is rotatably coupled to the planet gear carrier such that it is rotatable about its respective local axis, wherein the electric machine assembly further comprises a plurality of rotors, wherein each of the plurality of rotors of the electric machine is coupled to one of the planet gears of the plurality of planet gears such that it is rotatable about the local axis of the respective planet gear with the respective planet gear.

4. The turbomachine of claim 1, wherein the electric machine assembly is configured to generate between about 100 kilowatts of electrical power and about 10 megawatts of electrical power during operation.

5. The turbomachine of claim 1, wherein the electric machine assembly is configured to provide between about 130 horsepower and about 13,000 horsepower of mechanical power to the first plurality of turbine rotor blades, the second plurality of turbine rotor blades, or both during operation.

6. The turbomachine of claim 1, wherein the first plurality of turbine rotor blades is coupled to the ring gear, wherein the second plurality of turbine rotor blades is coupled to the sun gear.

7. The turbomachine of claim 1, wherein the first plurality of turbine rotor blades is configured as a plurality of low-speed turbine rotor blades, wherein the second plurality of turbine rotor blades is configured as a plurality of high-speed turbine rotor blades, and wherein the plurality of low-speed turbine rotor blades are configured to rotate in an opposite circumferential direction than the plurality of high-speed turbine rotor blades.

8. A turbomachine comprising:
a first rotatable component;
a second rotatable component;
a stationary component that is stationary relative to the first and second rotatable components;

a gearbox comprising a ring gear, a sun gear, a planet gear, and a planet gear carrier, the planet gear defining a local axis and coupled to the planet gear carrier, wherein the first rotatable component, the second rotatable component, and the stationary component are each coupled to one of the ring gear, the planet gear carrier, or the sun gear such that the first rotatable component is rotatable with the second rotatable component through the gearbox; and an electric machine assembly comprising a rotor and a stator, the rotor coupled to the planet gear of the gearbox such that the rotor is rotatable about the local axis of the planet gear with the planet gear during operation of the turbomachine and the stator positioned radially between the planet gear and the ring gear, the ring gear extending axially outward of both end portions of the stator, wherein the stator is fixed relative to the planet gear carrier.

9. The turbomachine of claim 8, wherein the first rotatable component is a first plurality of turbine rotor blades, wherein the second rotatable component is a second plurality of turbine rotor blades, wherein the first plurality of turbine rotor blades and second plurality of turbine rotor blades are alternatingly spaced along an axial direction of the turbomachine.

10. The turbomachine of claim 9, wherein the first plurality of turbine rotor blades is configured as a plurality of low-speed turbine rotor blades, wherein the second plurality of turbine rotor blades is configured as a plurality of high-speed turbine rotor blades, and wherein the plurality of low-speed turbine rotor blades are configured to rotate in an opposite circumferential direction than the plurality of high-speed turbine rotor blades.

11. The turbomachine of claim 8, wherein the planet gear is coupled to a planet gear shaft extending along the local axis of the planet gear, and wherein the rotor of the electric machine assembly is coupled to the planet gear shaft.

12. The turbomachine of claim 11, wherein the planet gear and planet gear shaft are together rotatably supported substantially completely by a bearing assembly, the bearing assembly comprising a first bearing positioned forward of the planet gear and rotor and a second bearing positioned aft of the planet gear and rotor.

13. The turbomachine of claim 8, wherein the planet gear of the gearbox is a first planet gear, wherein the gearbox further comprises a second planet gear coupled to the planet gear carrier and defining a local axis, wherein the rotor and the stator of the electric machine assembly are configured as part of a first electric machine, wherein the electric machine assembly further comprises a second electric machine, the second electric machine comprising a second rotor and a second stator, wherein the second rotor is coupled to the second planet gear of the gearbox such that the second rotor is rotatable about the local axis of the second planet gear with the second planet gear during operation of the turbomachine.

14. The turbomachine of claim 13, wherein the electric machine assembly comprises a main electric line, and wherein the first electric machine and the second electric machine are electrically connected in series with the main electric line.

15. The turbomachine of claim 8, wherein the first rotatable component is a low pressure spool of the turbomachine, and wherein the second rotatable component is a fan shaft of a fan assembly of the turbomachine.

16. A propulsion system comprising:
- a turbomachine comprising a gearbox and an electric machine assembly, the gearbox comprising a ring gear, a planet gear, a sun gear, and a planet gear carrier, and the electric machine assembly comprising a rotor and a stator, the rotor of the electric machine assembly coupled to one of the ring gear, the planet gear, or the sun gear of the gearbox such that the rotor rotates relative to the stator during operation;
- wherein the rotor of the electric machine assembly is coupled to the planet gear such that the rotor is rotatable about a local axis of the planet gear with the planet gear; and
- wherein the planet gear carrier supports a mount cantilevered over and extending along the planet gear in an axial direction such that the mount and the planet gear overlap in a radial direction, the mount having the stator affixed thereto.

17. The propulsion system of claim 16, wherein the electrical power component is configured as an electric energy storage unit configured to receive electrical power from the electric machine of the turbomachine during operation of the turbomachine.

18. The propulsion system of claim 16, wherein the electrical power component is configured as an electric propulsor configured to generate thrust for the propulsion system when the electric machine of the turbomachine provides electrical power to the electric propulsor.

19. The propulsion system of claim 16, wherein the electric machine assembly is configured to generate between about 100 kilowatts of electrical power and about 10 megawatts of electrical power during operation.

* * * * *